United States Patent [19]
Armstrong et al.

[11] 3,816,201

[45] June 11, 1974

[54] LAMINATED STRUCTURES AND METHOD OF FORMING THE SAME

[75] Inventors: Ramsey C. Armstrong, Corona Del Mar; Herbert Hoover, III, San Marino, both of Calif.

[73] Assignee: The Sierracin Corporation, Sylmar, Calif.

[22] Filed: Feb. 22, 1973

[21] Appl. No.: 334,922

Related U.S. Application Data

[60] Division of Ser. No. 22,878, March 26, 1970, Pat. No. 3,718,535, which is a continuation-in-part of Ser. No. 634,296, April 27, 1967, abandoned, which is a continuation-in-part of Ser. No. 575,072, Aug. 25, 1966, abandoned.

[52] U.S. Cl................... 156/106, 117/211, 219/203
[51] Int. Cl....................... B32b 17/10, B32b 31/12
[58] Field of Search ............ 156/99, 102, 104, 106; 161/194, 197, 199, 214, 218; 219/203; 117/211, 119

[56] References Cited
UNITED STATES PATENTS

| | | | |
|---|---|---|---|
| 2,837,454 | 6/1958 | Watkins et al. | 161/199 |
| 3,020,376 | 2/1962 | Hoffmann et al. | 161/45 |
| 3,180,781 | 4/1965 | Ryan et al. | 156/99 |
| 3,234,062 | 2/1966 | Morris | 156/104 |
| 3,290,203 | 12/1966 | Anronson et al. | 161/218 |
| 3,310,458 | 3/1967 | Mattimoe et al. | 161/248 |
| 3,388,035 | 6/1968 | Mattimoe et al. | 161/199 |
| 3,424,642 | 1/1969 | Orcutt | 219/203 |

*Primary Examiner*—Daniel J. Fritsch
*Attorney, Agent, or Firm*—Lyon & Lyon

[57] ABSTRACT

Flexible sublaminates suitable for lamination between rigid transparent dielectric plies to form electrically powerable transparent safety glass-type constructions are prepared by first disposing on at least one surface of a carrier film a thin, adherent electrically conductive metallic coating and subsequently laminating to the metal-coated surface an interlayer film to form a flexible coherent laminar structure transparent when its exterior surfaces are smooth. Carrier films employed have an ultimate elongation of less than about 150 percent and tensile strength greater than about 5000 psi; interlayer films have ultimate elongation greater than about 150 percent and tensile strength less than about 6500 psi. Exemplary conductive metals are gold, silver, chromium, copper, and Inconel.

12 Claims, 3 Drawing Figures

LAMINATED STRUCTURES AND METHOD OF FORMING THE SAME

CROSS-REFERENCES TO RELATED APPLICATIONS

This is a division of application Ser. No. 22,878, filed Mar. 26, 1970, now U.S. Pat. No. 3,718,535.

Application Ser. No. 22,878 is a continuation in part of application Ser. No. 634,296, filed Apr. 27, 1967 now abandoned, which is in turn a continuation-in-part of application Ser. No. 575,072 filed Aug. 25, 1966, and now abandoned.

BACKGROUND OF THE INVENTION

This invention relates to electrically powerable transparencies.

It is well known that resistance to shatter in a window, aircraft canopy, windshield or the like can be markedly enhanced by providing a safety glass-type construction, i.e., one wherein flexible plastic interlayer films are disposed between and laminated to rigid transparent dielectric plies of, e.g., glass or polymethyl methacrylate.

The principal purpose of such constructions has been impartation of shatter resistance. However, it has been proposed that thin, transparent metal coatings be applied to the inner surface of one of the plurality of rigid plies employed in safety glass-type constructions. In the completed construction, electrical busbars and connections are made so that electrical current can be supplied to the contained conductive coating, rendering the construction electrically powerable. Heat generated by powered coatings in such applications can serve to prevent formation of ice or fog on the outside surfaces of transparencies used, e.g., as aircraft windshields or canopies. Such coatings are also useful for radio frequency attenuation or shielding, and can be used in laminated transparencies to reflect a portion of the sun's infrared radiation, thereby reducing heating within, e.g., an aircraft cockpit, while yet permitting vision through the laminated structure. Among the conductive coatings which have heretofore been employed for such purposes are tin oxide coatings, vacuum-deposited gold or copper and the like.

The thin, adherent electrically conductive metal coatings, when disposed directly onto a rigid ply as has heretofore been the practice, are by reason of their fragile nature peculiarly susceptible to disruption during the course of manufacture of the ultimate, powerable laminate. Subsequently in service, such disruptions occasion regions of unduly high local current density, leading to electrical burnout.

If a conductive metal coating is applied as by vacuum deposition directly on a rigid ply material such as glass, at a subsequent stage of manufacture when the glass is cut, e.g., to form a windshield, the cutting process itself can introduce disruptions along the metal-coated edge portions of the windshield blank to which busbars are subsequently to be applied. On the other hand, where the windshield blanks are cut before metal deposition, the subsequent metal deposition must needs proceed on a piecemeal basis and the advantages of continuous metallization are lost. The disadvantages of the alternative last-mentioned are multiplied by the practice of the safety glass industry in impartating curvature to the rigid plies between which the interlayer film is to be disposed. For example, windshield blanks are edge-supported in racks and heated in such racks so that, by reason of their weight, they sag to a desired curvature. To ensure that the two rigid plies of the windshield will be perfectly mated, two blanks are placed one atop the other in the rack, with the result that upon heating they sag conformably. If the ply itself is to be metallized, one of the sag-formed doublets must be separated from its mate in the process train, separately matallized, and then returned to that same mate for lamination of the ultimate structure. Accordingly, to the disadvantages of piecemeal metallization are added the difficulties inherent in increased handling of the typically fragile rigid plies.

By either alternative, i.e., whether the rigid ply material is metallized before or after blanks are cut therefrom, the fragile conductive metal coating is carried by the windshield blank in exposed condition for a substantial period between metallization and lay up and lamination of the ultimate safety glass-type construction.

It is proposed in U.S. Pat. No. 3,310,458 to Mattimoe et al. to laminate in a single lamination step a rigid transparent ply or plies of, e.g., polymethylmethacrylate with a polymerized diethylene glycol bis allyl carbonate sheet bearing an electrically conductive metal coating and with an interposed polyvinyl butyral interlayer film. That approach, to be sure, avoids certain difficulties experienced when the rigid ply itself is metallized, but other and more serious difficulties are engendered thereby. Those difficulties, seemingly not appreciated by the patentees, include the fact that the more expensive polymethylmethacrylate ply or plies are put at risk by single stage lamination. By the single stage approach the opportunity for testing to determine whether the fragile metal coating has survived lamination does not arise until the conductively coated sheet and interlayer have been, for all practical purposes, irrevocably joined to the rigid ply or plies. It now appears that the risk of disrupting the electrical continuity of the conductively coated sheet is greatest at the point of its first lamination. Should that disruption occur in the single stage lamination approach, then the rigid transparent plies must be discarded along with the interlayer and conductively coated sheet materials. Plies subjected to such risk and subsequently discarded might include sag-formed doublets, chemically tempered glass, optical glass for lense employment or other exotic materials for advanced laminated transparencies, so that the economic impact of such discard cannot be underestimated.

SUMMARY OF THE INVENTION

According to this invention, there is provided a flexible, coherent laminar structure primarily defined in two dimensions (i.e., length and width substantially greater than thickness) and transparent when its exterior surfaces are smooth which comprises a carrier film bearing on at least one surface a thin adherent electrically conductive metal coating disposed between the carrier film and an interlayer film adhered to the metal-coated surface of the carrier film. The flexible laminar structure includes and protects a conductive metallic coating borne by the carrier film.

The flexible laminar structures can be conveniently rolled or stacked for storage or shipment prior to disposition between rigid e.g., glass, plies and lamination to form electrically powerable transparencies. The carrier film can be, e.g., vacuum metallized on a continuous basis, laminated to an interlayer film at its metal-coated surface, and the laminate cut to any desired shape for disposition in an ultimate laminate such as an electrically powerable windshield without unduly disrupting the integrity of the contained conductive coating. The risk of disruption is greater at that point at which the metal-coated carrier film is first laminated than is the case in subsequent lamination, and by the sublaminate schema of the invention the occurrence of chance disruption can be conveniently detected by testing under power before the rigid transparent plies are put at risk.

The advantages of the invention will become more apparent from the detailed description which follows and from the attached drawing (not to scale) in which.

DETAILED DESCRIPTION OF THE INVENTION

Figure 1:
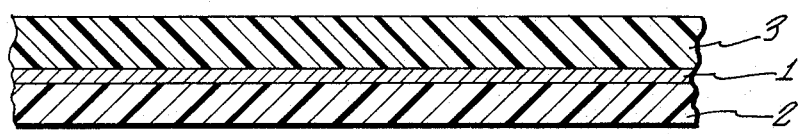
FIG. 1 depicts in cross-section a flexible laminar structure formed according to a first embodiment of the invention.

With reference now to FIG. 1, there is depicted a thin, adherent electrically conductive metal coating 1 disposed on carrier film 2 to form a metal-coated surface of the carrier film, which surface is bonded to interlayer film 3. The interlayer film can be bonded to the metal-coated surface of the carrier film by the conventional heat and pressure lamination in a manner which will be apparent to the art-skilled. For example, when the interlayer film is polyvinyl butyral and the carrier film "Mylar" (a polyethylene terephthalate polyester film sold by E. I. DuPont and Company), the sublaminate lay up is typically subjected to from 15 to 20 psi at 200°F. for approximately 2 hours. Sublaminates like that shown in FIG. 1 can be subsequently disposed between and laminated to rigid, transparent plies to form a safety glass-like construction. In the embodiment shown in FIG. 1, wherein a second interlayer film is not laminated to the exposed surface of the carrier film, it is generally desirable to employ a transparent adhesive in bonding the carrier film to the rigid ply. Suitable adhesives for the various materials which can be employed in this invention will occur to the art-skilled. In a preferred embodiment wherein the carrier film is a polyethylene terephthalate polyester film and the rigid ply is glass, adhesives which can optionally be employed include polyester adhesives (e.g., Nos. 46950, 46960, 46971 and 49690 in DuPont Technical Bulletin No. 17 — "Polyester Adhesives"), polyamide resin adhesives such as "Versalon" 1140 (General Mills), and a wide variety of vinyl resin-based adhesives used in the safety glass-type construction industry.

The embodiment depicted in FIG. 1 is particularly suited for subsequent lamination between rigid plies wherein a second interlayer film is interposed between the exposed carrier film surface and one of the rigid plies. The second interlayer film, e.g., polyvinyl butyral, can serve in lieu of any adhesive in bonding the exposed carrier film surface to the adjacent glass or plastic ply. The sublaminate of FIG. 1 is particularly adapted to ultimate lamination in this manner when a sunshade tint band containing windshield or the like is contemplated as the end-product laminate. In conventional safety glass construction, such tint bands are incorporated by employment of interlayer material having a uniform sunshade-tinted band along one edge thereof. In order that the edge of the tint band appear horizontal (i.e., straight) to the driver when conformed to the compound curvature of an automobile windshield, that edge necessarily projects onto a flat plane as a non-rectilinear line. Conventional techniques for edge-dyeing interlayer sheets do not admit of provision for such non-rectilinear tint bands, so uniformly edge-dyed interlayers are instead stretched over a suitably shaped form to impart the proper geometry to the tint band prior to incorporation of the interlayer sheet in a windshield lay up.

Electrically powerable sublaminates do not admit of such stretching. Using the embodiment of FIG. 1, the sublaminate can be laid up with a pre-stretched band-bearing interlayer sheet and sag-formed windshield doublets and laminated. Thereby, the advantages of the tint band and of electrical powerability are obtained. Neither advantage need be sacrificed to the other.

Figure 2:
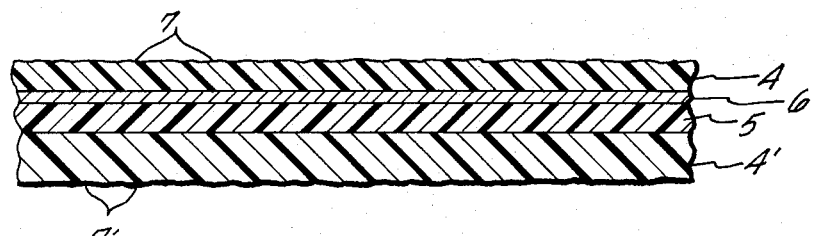
FIG. 2 depicts in cross-section a flexible laminar structure formed according to a second embodiment of the invention.

FIG. 2 illustrates an embodiment in which interlayer films 4 and 4' are adhered to either side of a carrier film 5 bearing electrically conducting metal coating 6. Exterior surfaces 7 and 7' can be textured as shown.

Figure 3:
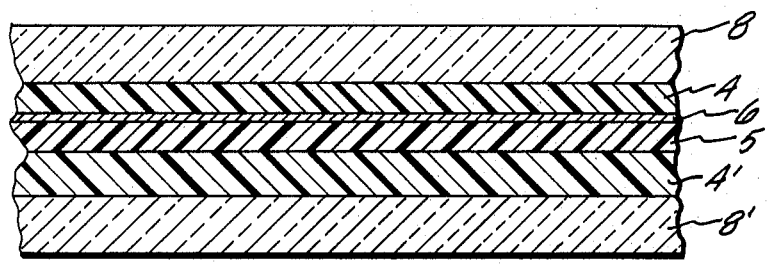
FIG. 3 depicts in cross-section a safety glass-type construction formed according to the invention and embodying the flexible laminar structure of FIG. 2.

FIG. 3 depicts a safety glass-type construction in which a sublaminate like that of FIG. 2 has been disposed between and bonded to rigid plies 8 and 8', e.g., glass plies. It will be noted that by the process of lamination itself, the texturing of the exterior surfaces of the sublaminate disappears so that the interlayer films are returned to the transparent condition in which they existed prior to texturing. Of course, the texturing of the interlayer films can occur simultaneously with the formation of the film. What is important to observe, in any case, is that the interlayer of film is of a material adapted to become transparent when its exterior surfaces are smooth. Typically, when the interlayer material is polyvinyl butyral and the rigid ply glass or polycarbonate, it can be laminated to the rigid plies by exposure to 200 psi at 275°F. for approximately one hour. When the rigid plies are of stretched methylmethacrylate, lamination typically has been effected at about 225°F., 200 psi over about 2 hours. When the rigid ply is "as cast" methylmethacrylate, lamination can be achieved at, e.g., 240°F., 200 psi over the course of about one hour. In every case, the optimal temperature, pressure and time for lamination of the sublaminates to the rigid plies can be readily determined by those skilled in the lamination art. This is particularly the case in the safety glass industry, wherein such interlayer films and rigid, transparent plies are commonly laminated under a variety of conditions and to a variety of ends.

Electrically powerable transparencies such as that depicted in FIG. 3 can be easily provided with busbars (not shown) to distribute electrical current thereto. For example, prior to the lamination of the various laminae of the sublaminate, a conductive metallic strip or braid can be placed along the edge portions of the lay up between the metal-coated surface of the carrier film and the interlayer film. Alternatively, conductive metallic particles, e.g., silver, can be applied in a resin binder along edge portions of the conductive metal coating to deposit an electrically continuous silver busbar. Other means of incorporating busbars in the sublaminates of the invention, as well as means for connecting the busbars to the source of power, will become apparent to the art-skilled in light of the above.

The term "carrier film" as used herein refers to a flexble plastic material transparent when its exterior surfaces are smooth and capable of enduring a vacuum metal deposition process and hence having a heat distortion temperature greater than about 120°F., preferably greater than about 150°F.; permitting of the deposition of satisfactory electrically conductive coatings and hence relatively free of plasticizers; and sufficiently dimensionally stable to avoid destruction of the electrical integrity of the coating borne by it during the temperature cycling experienced in lamination and during service powering. Carrier films can in particular instances be pretreated by conventional techniques to enhance their adherability to adjacent laminae; if desired. Polytetrafluoroethylene films are conventionally pretreated by glow discharge, immersion in sodium-liquid ammonia solution or in sodium naphthalene solutions (See U.S. Pat. No. 2,809,130 to Rappaport). Polyethylene terephthalate polyester carrier films can be subjected to glow discharge, hot aklaline solution (See U.S. Pat. No. 2,837,454 to Watkins, et al.) or flame treatment (e.g., British Pat. No. 828,381 to Gore, et al.).

Typical carrier films can range in thickness from about .00025 to .015 in., and thicker films can, if desired, be employed subject to the requirement of a suitable degree of flexibility and energy-absorbing ability. The energy-absorbing ability of laminae interposed between rigid plies in safety glass-type constructions is important in diminishing the consequences of head impact during vehicular accidents, and decreases with increasing thickness. Flexibility is required so that the sublaminate can be conformed to the compound curvature of sag-formed doublets and the like. An appropriate degree of flexibility is also quite important in vacuum metallization and sublaminate transportation. Flexibility decreases as thickness increases — the less flexible a material is, the greater is its minimum radius of curvature. Unduly inflexible materials, to the extent they can be rolled at all, must needs be rolled about a roll core whose diameter can become prohibitively great before the minimum radius of curvature for the material is realized. Vacuum metalization proceeds in a vacuum chamber. The complexities of constructing that chamber are greatly amplified when the carrier film to be metallized cannot be rolled and positioned in the chamber but must instead gain entrance to and leave the chamber by way of a complicated series of airlocks. A carrier film thickness of about .015 inch has been adopted above as a practical upper limit for most purposes, upon balance of all the foregoing considerations.

While precise quantification is difficult when the wide variety of suitable interlayer and carrier materials is considered, it can generally be said that typical carrier materials will have an ultimate elongation of less than about 150% and tensile strength greater than about 5000 psi, each parameter being defined according to ASTM D 412-68. The liberal interpretation intended of this general specification of elongation and tensile strength will be apparent from the following table, wherein there are listed suitable materials for carrier employment, together with ultimate elongations and tensile strengths in which they are presently available.

What is claimed is:

1. A method of producing a laminated transparent safety glass type construction which comprises
    a. disposing a thin adherent electrically conductive metallic coating on at least one surface of a carrier film, and
    b. subsequently laminating to the side of said carrier film which bears the said coating a first interlayer film, said first interlayer film being at least 0.015 inch in thickness, thereby forming a flexible, self-supporting and coherent electrically heatable sublaminar structure primarily defined in two dimensions and transparent when its exterior surfaces are smooth, said sublaminar structure consisting essentially of the metal-coated carrier film and said interlayer film, the surface of said interlayer film opposite that laminated to said metal-coated side presenting an exterior surface of the sublaminar structure,
    c. subsequently laminating rigid transparent dielectric plies to each side of said sublaminar structure to form a coherent transparent safety-glass type construction.

2. The method of claim 1 wherein in step C a second interlayer film is interposed between one of said plies and the exposed surface of said carrier film prior to lamination of said plies to said structure.

3. The method of claim 1 wherein but one surface of the carrier film is metal-coated.

4. The method of claim 3 wherein an interlayer film is laminated only to the metal-coated surface of the carrier film.

5. The method of claim 3 wherein a second interlayer film is laminated to the surface of the carrier film opposite the metal-coated surface thereof such that the non-adhered surfaces of the interlayer films present the exterior surfaces to the sublaminar structure.

6. The method of claim 5 wherein the interlayer films present textured exterior surfaces which are adapted to be made smooth by said further lamination of said structure between said plies.

7. The method of claim 1 wherein the said carrier film is a polyethylene terephthalate polyester film and wherein said interlayer film is selected from the group consisting of polyvinyl butral, polyvinyl chloride and polyurethane films.

8. The method of claim 1 wherein the said carrier film has an ultimate elongation of less than about 150 percent and tensile strength greater than about 5,000 psi, and wherein said interlayer film has an ultimate elongation of greater than about 150 percent and tensile strength less than about 6,000 psi.

9. The method of claim 7 wherein said conductive metal is selected from the group consisting of gold, silver, chromium, copper and Inconel.

10. The method of claim 8 wherein said conductive metal is selected from the group consisting of gold, silver, chromium, copper and Inconel.

11. The method of claim 9 wherein said interlayer film is polyvinyl butyral.

12. The method of claim 9 wherein said conductive metal is gold.

\* \* \* \* \*